United States Patent Office 2,894,027
Patented July 7, 1959

2,894,027

PURIFICATION OF LYSINE

Walter L. Sutor, Grand Island, N.Y., assignor to E. I. du Pont de Nemours and Company, Wilmington, Del., a corporation of Delaware No Drawing. Application August 1, 1956
Serial No. 601,362

5 Claims. (Cl. 260—534)

This invention relates to the purification of lysine and more particularly to a method for removing various amine impurities from aqueous solutions of lysine.

A known method of synthesizing lysine involves reacting a 5-(4-halobutyl) hydantoin (e.g. the chloro or bromo compound) with ammonia and hydrolyzing the resulting mixture of products with an aqueous solution of a strong acid or base. Various secondary and tertiary amino compounds which are substituted hydantoins are formed as by-products of the reaction of the halobutyl hydantoin with ammonia. In the hydrolysis reaction to produce lysine, the above by-products hydrolyze to by-product amino compounds which contaminate the lysine. These contaminants generally include secondary and tertiary amines such as di-(5-amino-5-carboxypentyl)-amine and tri-(5-amino-5-carboxypentyl) amine.

The above type impurities are formed along with lysine in most syntheses of lysine. Since they are not nutritionally useful, their presence in lysine is generally objectionable. However, no practical way has been available for removing small amounts of these impurities by fractional crystallization methods.

It is an object of the invention to provide a practical method for effectively removing or separating such amine impurities from lysine. Another object is to provide a simple method for purifying aqueous solutions of lysine contaminated by such impurities. A further object is to provide a purification method in which lysine is selectively adsorbed on a cation-exchange resin. Still further objects of the invention will be apparent from the following description.

Lysine is a primary amine whereas di-(5-amino-5-carboxypentyl)amine and tri-(5-amino-5-carboxypentyl)-amine, respectively, are secondary and tertiary amines. Since secondary and tertiary amines are generally more basic than the corresponding primary amines, they would be expected to be adsorbed preferentially or selectively from lysine solutions containing them.

Contrary to such expectation, it has been found that when a solution containing both lysine and the above secondary and tertiary amine type impurities is passed through a bed of a cation-exchange resin, the lysine component is selectively and preferentially adsorbed by the resin. It has further been discovered that this selective adsorption of lysine can be used as the basis of a practical method for separating such impurities from lysine.

Accordingly, the objects of the invention are accomplished by passing an aqueous solution of lysine containing such impurities through a bed of the ammonium form of a cation-exchange resin having strongly acidic functional groups, and continuing such passage until the bed is substantially completely loaded with lysine, i.e. a point where substantial amounts of lysine begin to appear in the effluent, while discarding the resulting effluent or collecting it for reworking. After the bed becomes loaded with lysine, preferably after it becomes slightly "over-loaded" with respect to lysine, the lysine adsorbed on the bed is eluted, e.g. with aqueous ammonia. The weight ratio of lysine to impurities in the effluent so obtained will be substantially greater than such ratio for the starting solution. On the other hand, the weight ratio of lysine to impurities in the effluent from the bed during the bed-loading step will be smaller than such ratio for the starting solution. This is because lysine is preferentially adsorbed by the resin. The net result of the operation described is the obtainment of a lysine solution substantially poorer in impurities than the starting solution.

Preferably, the cation-exchange resin is employed in the form of a vertical column through which the impure lysine solution is passed until the resin is loaded or slightly over-loaded with respect to lysine. Thus, the solution is passed through the column until lysine begins to appear in substantial amounts in the effluent. Preferably, passage of the solution is continued until the leakage of lysine into the effluent amounts to about 0.1 to 15%, most preferably 2 to 10%, of the amount of lysine fed to the column. After an intermediate water wash, a solution of an eluting agent is then passed through the column. By separately collecting the resulting effluent, a solution of lysine and the eluting agent is obtained. When a volatile eluting agent such as aqueous ammonia is used, the eluting agent can be volatilized from the effluent to obtain a lysine solution of greater purity than the starting impure solution.

The invention is illustrated by the following examples in which all percentages are by weight.

*Example 1*

A 20% aqueous solution of lysine glutamate containing 1.9% (based upon the weight of lysine present) of di-(5-amino-5-carboxypentyl)amine and tri-(5-amino-5-carboxypentyl)amine and other amine impurities was passed through a 7 foot column of a cation-exchange resin ($NH_4^+$ form) at room temperature at a feed rate of 0.8 gal./min./sq. ft. of column cross-section. The resin used was a commercial, 20 to 50 mesh (U.S. Standard screen scale) sulfonated copolymer of styrene and about 8% of divinylbenzene. Passage of the solution was continued until the column was loaded with lysine and about 10% of the lysine fed had leaked into the effluent, then the column was washed with water. When the lysine adsorbed by the resin was subsequently eluted with 29% aqueous ammonia, the resulting effluent solution contained lysine contaminated with di- and tri-(5-amino-5-carboxypentyl)amines equal to only 0.9% of the lysine present.

*Example 2*

In a similar experiment, when the impure feed solution was fed only until the resin column was loaded with lysine but not "over-loaded" to any substantial extent, i.e. no substantial leakage of lysine into the effluent, the lysine solution obtained by subsequently eluting the resin with aqueous ammonia contained the above amine impurities in an amount corresponding to 1.4% of the lysine present as compared with 1.9% for the original feed solution. These results show that while a significant lowering of the amount of impurities resulted, purification to a markedly greater extent is obtained when feeding of the impure solution is continued until about 10% of the lysine has leaked through the resin column, as in Example 1.

When the impure lysine solution being purified is a solution of lysine glutamate, the glutamic acid component passes through as ammonium glutamate into the effluent where the secondary and tertiary amine type impurities are concentrated with respect to the lysine. The invention is equally effective in purifying impure solutions in which the lysine is present as free lysine instead of as the salt with glutamic acid.

Example 3

An aqueous lysine solution containing about 3% each of lysine and ammonium chloride and also di-(5-amino-5-carboxypentyl)amine in an amount equal to about 7% of the weight of the lysine present and considerably smaller amounts of tri-(5-amino-5-carboxypentyl)-amine, was passed through an 8 foot resin column similar to that of Example 1 at a rate of 0.8 gal./min./sq. ft. of column cross-section. Passage of the solution was continued until the column was loaded with lysine and about 2% of the lysine fed had leaked into the effluent. The column was then washed with water and the lysine adsorbed on the column was eluted with 20% aqueous ammonia to obtain an effluent containing 2.5% di-(5-amino-5-carboxypentyl)amine based on the weight of lysine present in the effluent.

Example 4

Example 3 was repeated except that passage of the impure feed solution through the column was discontinued when only 1% of the lysine fed had leaked into the effluent. In this case, the lysine solution obtained by eluting the adsorbed lysine from the column with 20% aqueous ammonia contained 5.4% of di-(5-amino-5-carboxypentyl)amine based on the weight of lysine present.

The preferred agent for eluting lysine from the resin is aqueous ammonia. The strength of such a solution can be varied considerably but generally will range from about 5 to 29%. Weaker solutions can be used but require longer eluting times and give excessively dilute lysine solutions. Stronger aqueous ammonia solutions can also be used.

Temperature is not a critical factor in practicing the invention. Temperatures below room temperature are usable but appear to offer no advantages. Higher temperatures up to the normal boiling points of the solutions (or higher if operated under pressure) are also usable. The operations illustrated by the examples were carried out at about room temperature.

Any of the common cation-exchange resins having strongly acidic functional groups, such as the sulfonic acid, phosphonic acid or phosphonous acid groups, are suitable for the present purpose. The preferred resins are those of the sulfonic acid types, such as the sulfonated coals, the sulfonated phenol-aldehyde resins and the nuclear sulfonated aromatic hydrocarbon resins. The nuclear sulfonated aromatic hydrocarbon cross-linked resins such as the sulfonated copolymers of a monovinyl benzene and a polyvinyl benzene, particularly the sulfonated styrene-divinyl benzene copolymers having the equivalent of from 4 to 16% divinyl benzene which serves as a cross-linking agent, are most preferred. The resin will be used in particulate form and the particle size will generally range from about 20 to 100 mesh (U.S. Standard screen scale), most preferably 20 to 50 mesh.

The invention provides a simple but practical method for increasing the purity of lysine solutions. If particularly pure lysine solutions are desired, the partially purified solution resulting from a first resin treatment in accordance with the invention can be stripped of the eluting agent (ammonia) and the resin treatment repeated whereby the lysine will be further purified by again being selectively adsorbed by the resin. Such operations may be repeated as many times as is required to achieve the desired purification. Generally, one or two selective adsorptions on a cation-exchange resin will suffice, particularly when the solution treated in each instance contains about 2 to 15% more lysine than will be adsorbed by the resin bed in use.

I claim:

1. The method of purifying an impure aqueous solution of lysine containing amine impurities including the secondary and tertiary amines, di-(5-amino-5-carboxypentyl)amine and tri-(5-amino-5-carboxypentyl)amine, said method comprising passing said impure solution through a bed of the ammonium form of a strongly acidic cation-exchange resin until the bed is substantially completely loaded with lysine, then eluting lysine from said bed and collecting the resulting effluent solution in which the weight ratio of lysine to said secondary and tertiary amines is substantially greater than the corresponding ratio for said impure solution.

2. The method of purifying an impure aqueous solution of lysine containing amine impurities including the secondary and tertiary amines, di-(5-amino-5-carboxypentyl)amine and tri-(5-amino-5-carboxypentyl)amine, said method comprising passing said impure solution through a bed of the ammonium form of a strongly acidic cation-exchange resin unitl 0.1 to 15% of the lysine in the solution fed to the bed has leaked through into the effluent, then passing aqueous ammonia through the bed while collecting the resulting effluent solution of lysine poorer with respect to said secondary and tertiary amines than said impure solution.

3. The method of claim 2 employing aqueous ammonia of at least 5% strength for eluting the lysine.

4. The method of claim 2 wherein passage of the impure solution is continued until 2 to 10% of the lysine has leaked through the bed.

5. The method of claim 2 wherein the cation-exchange resin is a nuclear sulfonated aromatic hydrocarbon cross-linked resin.

References Cited in the file of this patent

UNITED STATES PATENTS

| | | |
|---|---|---|
| 2,387,824 | Block | Oct. 30, 1945 |
| 2,586,154 | Emmick | Feb. 19, 1952 |

OTHER REFERENCES

Block: Archives of Biochem., vol. 11 (1946), pp. 235–48.

Samuelson: Ion Exchangers in Analytical Chem., 1953, pages 210–13.